(12) United States Patent
Kuo et al.

(10) Patent No.: US 7,726,277 B2
(45) Date of Patent: Jun. 1, 2010

(54) ENGINE IDLE WARM-UP OF A HOMOGENEOUS CHARGE COMPRESSION IGNITION ENGINE

(75) Inventors: Tang-Wei Kuo, Troy, MI (US); Paul M. Najt, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 37 days.

(21) Appl. No.: 12/041,864

(22) Filed: Mar. 4, 2008

(65) Prior Publication Data

US 2008/0270004 A1    Oct. 30, 2008

Related U.S. Application Data

(60) Provisional application No. 60/893,153, filed on Mar. 6, 2007.

(51) Int. Cl.
*F02D 13/00* (2006.01)
*F02M 43/00* (2006.01)
(52) U.S. Cl. .................................... 123/345; 123/304
(58) Field of Classification Search .............. 123/294, 123/299, 300, 304, 305, 321, 434, 435, 480, 123/568.11; 701/104
See application file for complete search history.

(56) References Cited

U.S. PATENT DOCUMENTS

| | | | | |
|---|---|---|---|---|
| 5,845,492 A | * | 12/1998 | Isobe et al. | 60/284 |
| 5,974,792 A | * | 11/1999 | Isobe | 60/278 |
| 6,112,716 A | * | 9/2000 | Tachibana | 123/305 |
| 6,276,334 B1 | | 8/2001 | Flynn et al. | |
| 6,295,973 B1 | | 10/2001 | Yang | |
| 6,915,776 B2 | | 7/2005 | Zurloye et al. | |
| 6,971,365 B1 | | 12/2005 | Najt et al. | |
| 6,983,730 B2 | | 1/2006 | Kuzuyama | |
| 6,994,072 B2 | | 2/2006 | Kuo et al. | |
| 7,258,103 B2 | * | 8/2007 | Tahara et al. | 123/431 |
| 2004/0020473 A1 | * | 2/2004 | Vogt et al. | 123/494 |
| 2006/0016420 A1 | | 1/2006 | Kuo et al. | |
| 2006/0016423 A1 | | 1/2006 | Kuo et al. | |
| 2007/0119417 A1 | | 5/2007 | Eng et al. | |
| 2008/0141921 A1 | * | 6/2008 | Hinderks | 114/274 |

FOREIGN PATENT DOCUMENTS

DE    102005009104 B3    8/2006

* cited by examiner

*Primary Examiner*—John T Kwon

(57) ABSTRACT

A homogeneous charge compression ignition engine is fueled within a warm-up region of engine temperatures using a minimally defined fuel mass schedule and injection timings and simple interpolative techniques.

11 Claims, 3 Drawing Sheets

ENGINE IDLE WARM-UP OF A HOMOGENEOUS CHARGE COMPRESSION IGNITION ENGINE

CROSS REFERENCE TO RELATED APPLICATIONS

This application claims the benefit of U.S. Provisional Application No. 60/893,153 filed on Mar. 6, 2007 which is hereby incorporated herein by reference.

TECHNICAL FIELD

This disclosure pertains generally to internal combustion engine control systems, and more specifically to a method and apparatus to control a homogeneous charge compression ignition engine.

BACKGROUND

One engine system being developed for controlled auto-ignition combustion operation comprises an internal combustion engine designed to operate under an Otto cycle. The engine, equipped with direct in-cylinder fuel-injection, operates in a controlled auto-ignition mode under certain engine operating conditions to achieve improved engine fuel efficiency. A spark ignition system is employed to supplement the auto-ignition combustion process during certain operating conditions. Such engines are referred to as homogeneous-charge, compression-ignition ('HCCI') engines.

An HCCI engine operating in HCCI combustion mode creates a charge mixture of combusted gases, air, and fuel in a combustion chamber, and auto-ignition is initiated simultaneously from many ignition sites within the charge mixture during a compression stroke, resulting in stable power output, high thermal efficiency and low emissions. The combustion is highly diluted and uniformly distributed throughout the charge mixture, resulting in low burnt gas temperature and NOx emissions substantially lower than NOx emissions of either a spark ignition engine, or a diesel engine.

HCCI has been demonstrated in two-stroke gasoline engines using conventional compression ratios. It is believed that the high proportion of burnt gases remaining from the previous cycle, i.e., the residual content, within the two-stroke engine combustion chamber is responsible for providing the high mixture temperature necessary to promote auto-ignition in a highly diluted mixture.

In four-stroke engines with traditional valve means, the residual content is low and HCCI at part load is difficult to achieve. Known methods to induce HCCI at low and part loads include: 1) intake air heating, 2) variable compression ratio, and 3) blending gasoline with ignition promoters to create a more easily ignitable mixture than gasoline. In all the above methods, the range of engine speeds and loads in which HCCI can be achieved is relatively narrow. Extended range HCCI has been demonstrated in four-stroke gasoline engines using variable valve actuation with certain valve control strategies that effect a high proportion of residual combustion products from previous combustion cycle necessary for HCCI in a highly diluted mixture. With such valve strategies, the range of engine speeds and loads in which HCCI can be achieved is greatly expanded using a conventional compression ratio. One such valve strategy includes trapping and recompression of exhaust gases by early closure of the exhaust valve during the exhaust stroke and low valve lift. Such valve control can be implemented using variable cam phasers and two-step lift cams.

Whereas the above-mentioned HCCI engine operating strategies are based upon extensive steady-state tests under fully warmed-up engine operating conditions, cold starting and engine warm-up operation pose some additional challenges related to the diversity of engine operation temperatures experience during warm-up which manifest in undesirable combustion stability and emissions.

SUMMARY

A four-stroke internal combustion engine includes a direct-injection fuel system, a spark-ignition system, and a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston. A fuel mass is provided corresponding to each of a plurality of non-overlapping temperature regions within a predefined warm-up temperature region of engine operation. Engine temperature is determined within the predefined warm-up temperature region of engine operation. And, within temperature regions that are between two adjacent ones of the non-overlapping temperature regions, fuel mass is interpolated based on engine temperature and the fuel masses corresponding to the two adjacent non-overlapping temperature regions.

BRIEF DESCRIPTION OF THE DRAWINGS

One or more embodiments will now be described, by way of example, with reference to the accompanying drawings, in which.

DETAILED DESCRIPTION

Figure 1:
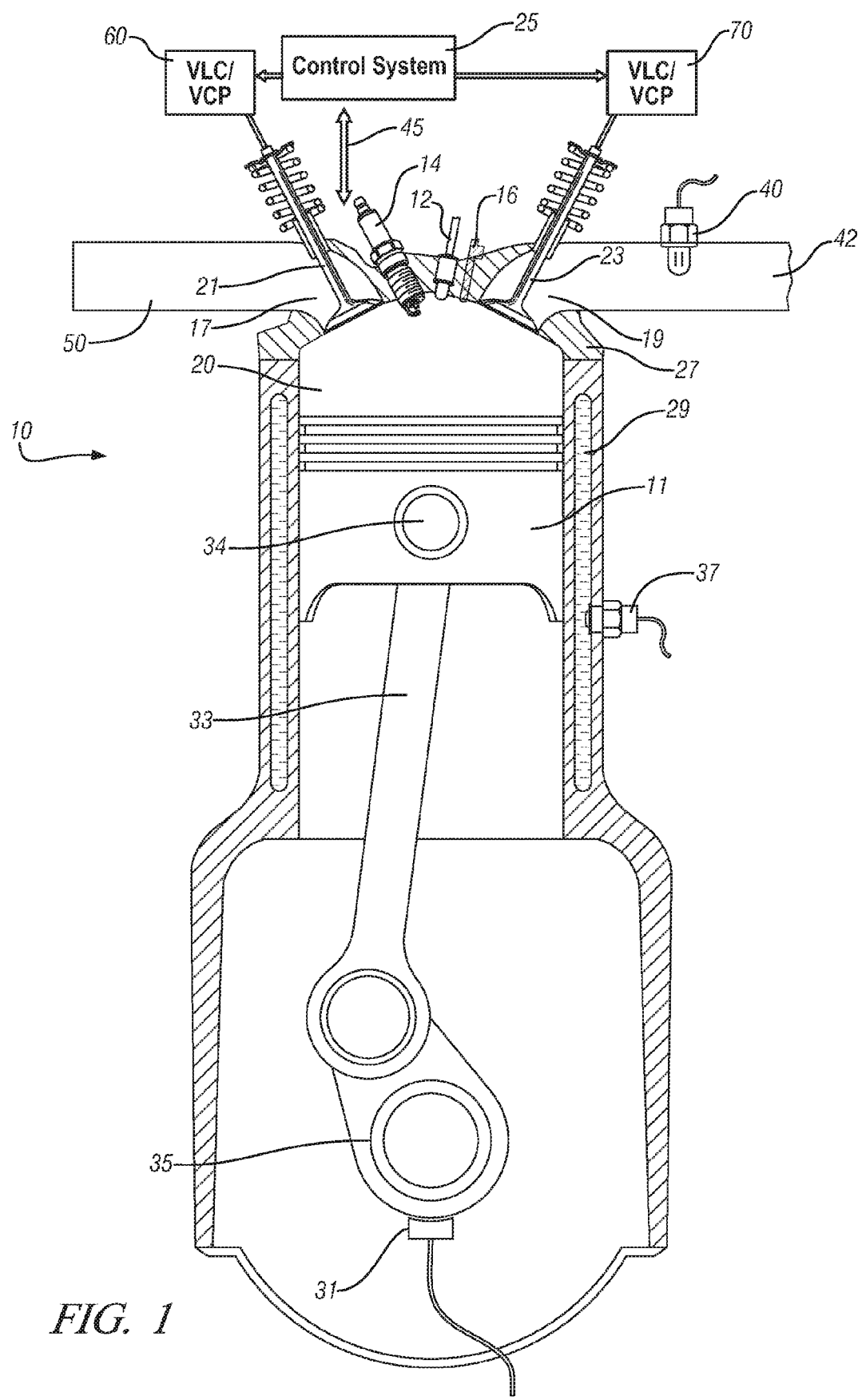
FIG. 1 is a schematic illustration of an exemplary internal combustion engine adapted for HCCI and SI operating modes in accordance with the present disclosure.

Referring now to the drawings, wherein the showings are for the purpose of illustrating certain exemplary embodiments only and not for the purpose of limiting the same, FIG. 1 shows a schematic of an internal combustion engine 10 and control system 25 which has been constructed in accordance with an embodiment of the present disclosure. The embodiment as shown is applied as part of an overall control scheme to operate an exemplary multi-cylinder, spark ignition, direct-injection, gasoline, four-stroke internal combustion engine adapted to operate under a controlled auto-ignition process, also referred to as homogenous-charge, compression-ignition ('HCCI') mode.

A naturally aspirated, a four-stroke, single cylinder, 0.55 liter, controlled auto-ignition, gasoline direct-injection fueled internal combustion engine having a compression ratio of substantially 12 to 13 was utilized in implementing the valve and fueling controls and acquisition of the various data embodied herein. Unless specifically discussed otherwise, all such implementations and acquisitions are assumed to be carried out under standard conditions as understood by one having ordinary skill in the art.

The exemplary engine 10 includes a cast-metal engine block with a plurality of cylinders formed therein, one of which is shown, and an engine head 27. Each cylinder comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides a parametric signal input to the control system 25 indicative of engine operating temperature useful in engine control. The engine preferably includes known systems including an external exhaust gas recirculation ('EGR') valve and an intake air throttle valve (not shown).

Each moveable piston 11 comprises a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23.

The intake and exhaust valves 21, 23 each have a head portion that includes a top portion that is exposed to the combustion chamber. Each of the valves 21, 23 has a stem that is connected to a valve actuation device. A valve actuation device, depicted as 60, is operative to control opening and closing of each of the intake valves 21, and a second valve actuation device 70 operative to control opening and closing of each of the exhaust valves 23. Each of the valve actuation devices 60, 70 comprises a device signally connected to the control system 25 and operative to control timing, duration, and magnitude of opening and closing of each valve, either in concert or individually. One embodiment of the exemplary engine comprises a dual overhead cam system which has variable lift control ('VLC') and variable cam phasing ('VCP') devices as part of the valve actuation devices 60, 70. VCP devices are operative to control timing of opening or closing of each intake valve and each exhaust valve relative to rotational position of the crankshaft and opens each valve for a fixed crank angle duration. VLC devices are operative to control magnitude of valve lift to one of two positions: one position to 3-5 mm lift for an open duration of 120-150 crank angle degrees, and another position to 9-12 mm lift for an open duration of 220-260 crank angle degrees. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas feedstream, and determine parameters associated therewith. The exhaust gas sensors 40 can comprise any of several known sensing devices operative to provide parametric values for the exhaustgas feedstream, including air/fuel ratio, or measurement of exhaust gas constituents, e.g. NOx, CO, HC, and others. The system may include an in-cylinder sensor 16 for monitoring combustion pressures, or non-intrusive pressure sensors or inferentially determined pressure determination (e.g. through crankshaft accelerations). The aforementioned sensors and metering devices each provide a signal as a parametric input to the control system 25. These parametric inputs can be used by the control system to determine combustion performance measurements.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and drivability. The control system 25 is operably connected to a plurality of devices through which an operator controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system 25 is operably connected to the engine 10, and functions to acquire parametric data from sensors, and control a variety of actuators of the engine 10 over appropriate interfaces 45. The control system 25 receives an engine torque command, and generates a desired torque output, based upon the operator inputs. Exemplary engine operating parameters that are sensed by control system 25 using the aforementioned sensors include engine coolant temperature, crankshaft rotational speed ('RPM') and position, manifold absolute pressure, ambient air flow and temperature, and ambient air pressure. Combustion performance measurements may comprise measured and inferred combustion parameters, including air/fuel ratio, location of peak combustion pressure, among others.

Actuators controlled by the control system 25 include: fuel injectors 12; the VCP/VLC valve actuation devices 60, 70; spark plug 14 operably connected to ignition modules for controlling spark dwell and timing; EGR valve (not shown), and, electronic throttle control module (not shown). Fuel injector 12 is preferably operable to inject fuel directly into each combustion chamber 20. Spark plug 14 is employed by the control system 25 to enhance ignition timing control of the exemplary engine across portions of the engine speed and load operating range. When the exemplary engine is operated in a purely HCCI mode, the engine does not utilize an energized spark plug. However, it has proven desirable to employ spark ignition to complement the HCCI mode under certain conditions, including, e.g. during cold start, to prevent fouling and, in accordance with certain aspects of the present disclosure at low load operating conditions near a low-load limit. Also, it has proven preferable to employ spark ignition at a high load operation limit in the HCCI mode, and at high speed/load operating conditions under throttled or un-throttled spark-ignition operation.

The control system 25 preferably comprises a general-purpose digital computer generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer.

Algorithms for engine control may be executed during preset loop. Algorithms stored in the non-volatile memory devices are executed by the central processing unit and are operable to monitor inputs from the sensing devices and execute control and diagnostic routines to control operation of the engine, using preset calibrations. Loop cycles may be executed at regular intervals, for example each 3.125, 6.25, 12.5, 25 and 100 milliseconds during ongoing engine operation. Alternatively, algorithms may be executed in response to occurrence of an event or interrupt request.

Figure 2:
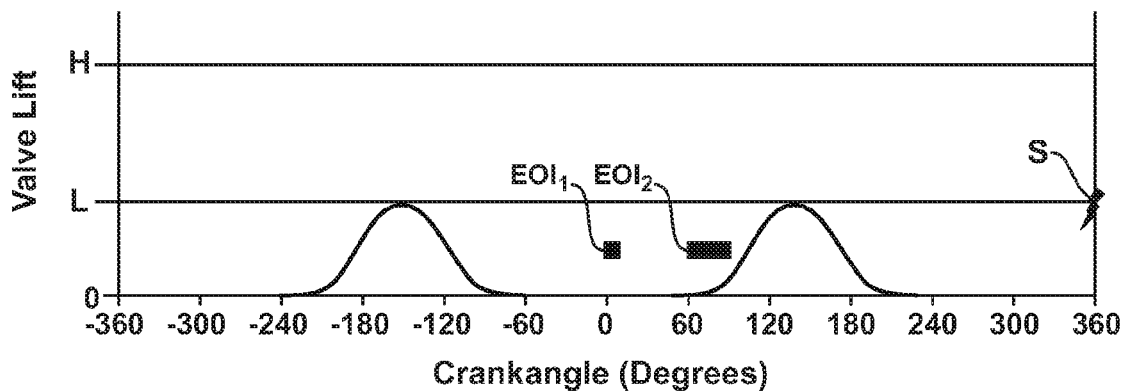
FIG. 2 illustrates a low temperature sub-region spark-assisted HCCI control strategy for engine warm-up in accordance with the present disclosure.
Figure 3:
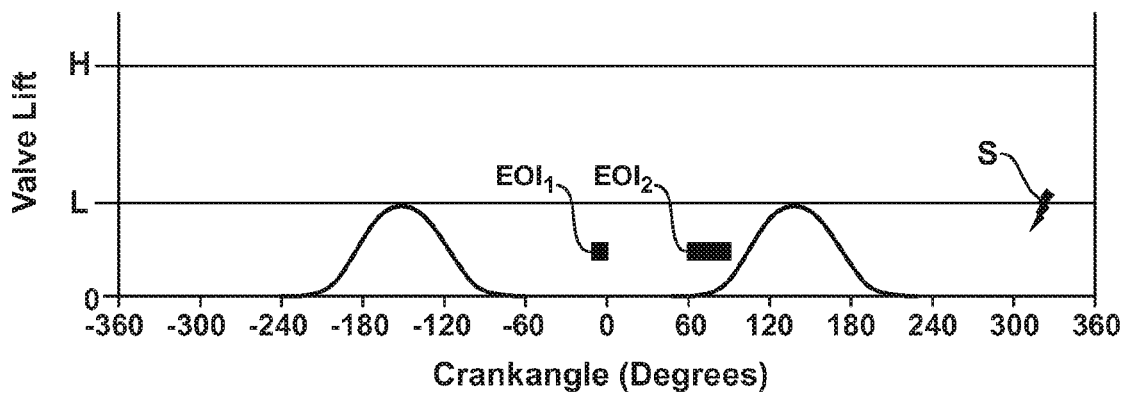
FIG. 3 illustrates a middle temperature sub-region spark-assisted HCCI control strategy for engine warm-up in accordance with the present disclosure.
Figure 4:
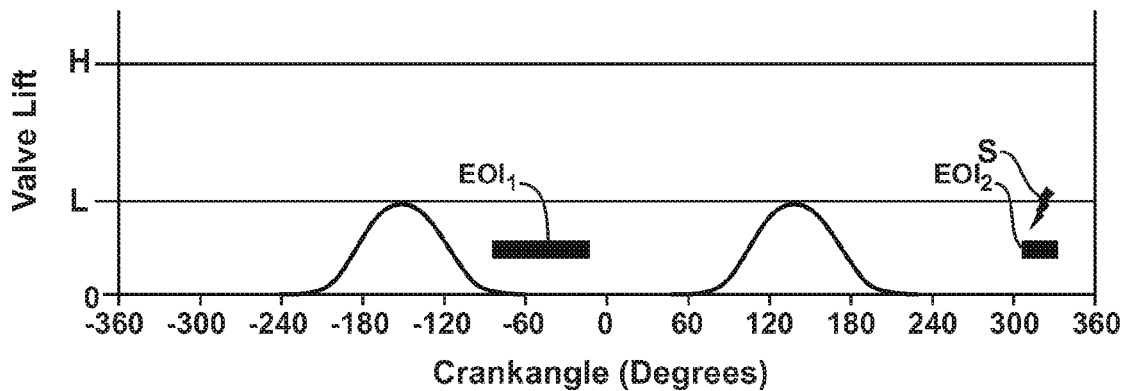
FIG. 4 illustrates a high temperature sub-region spark-assisted HCCI control strategy for engine warm-up in accordance with the present disclosure.

With reference now to FIGS. 2-5, coordinated valve, fueling and spark control employed in effecting the engine idle warm-up operation in accordance with the present disclosure is illustrated. Each of FIGS. 2-4 illustrates along a horizontal axis engine crank angle with a reference at zero corresponding to top dead center (TDC) between the exhaust and intake strokes of the piston (TDC intake). TDC between the compression and expansion strokes of the piston (TDC combustion) takes place at 360 crank angle degrees separation from TDC exhaust. Intake and exhaust valve lift is represented by the vertical axis and generally includes low and high lift points as illustrated corresponding to the low and high lift cam lifts that are enabled by the exemplary two-step lift cams of the exemplary hardware embodiment. Each of FIGS. 2-4 corresponds, respectively, to low, middle and high temperature warm-up sub-regions of engine operation within a predefined engine idle warm-up operating region. Such an engine idle warm-up operating region generally corresponds to engine operating temperatures from about 30 degrees Celsius and below through about 80 to 90 degrees Celsius and is intended to be inclusive of the low and high temperature sub-regions. Middle temperature sub-region is intended merely to be between, intermediate or intervening the low and high temperature sub-regions and is not intended to be limited to any strict mid-point, mean, average or other mathematical, algebraic, statistical or geometric definition of middle. Reference to low, middle and high temperature regions are understood to refer to the low, middle and high temperature warm-up sub-regions of the engine idle warm-up operating region of the present disclosure. Within such engine idle warm-up operating region, all FIGS. 2-4 represent operation of the engine in a spark-assisted HCCI mode with split injections as discussed in further detail herein below. Engine operating temperatures above about 80 to 90 degrees Celsius are, for purposes of the present disclosure, considered fully warmed up and conducive to alternative HCCI operating modes which are beyond the scope of the present disclosure.

Figure 5:
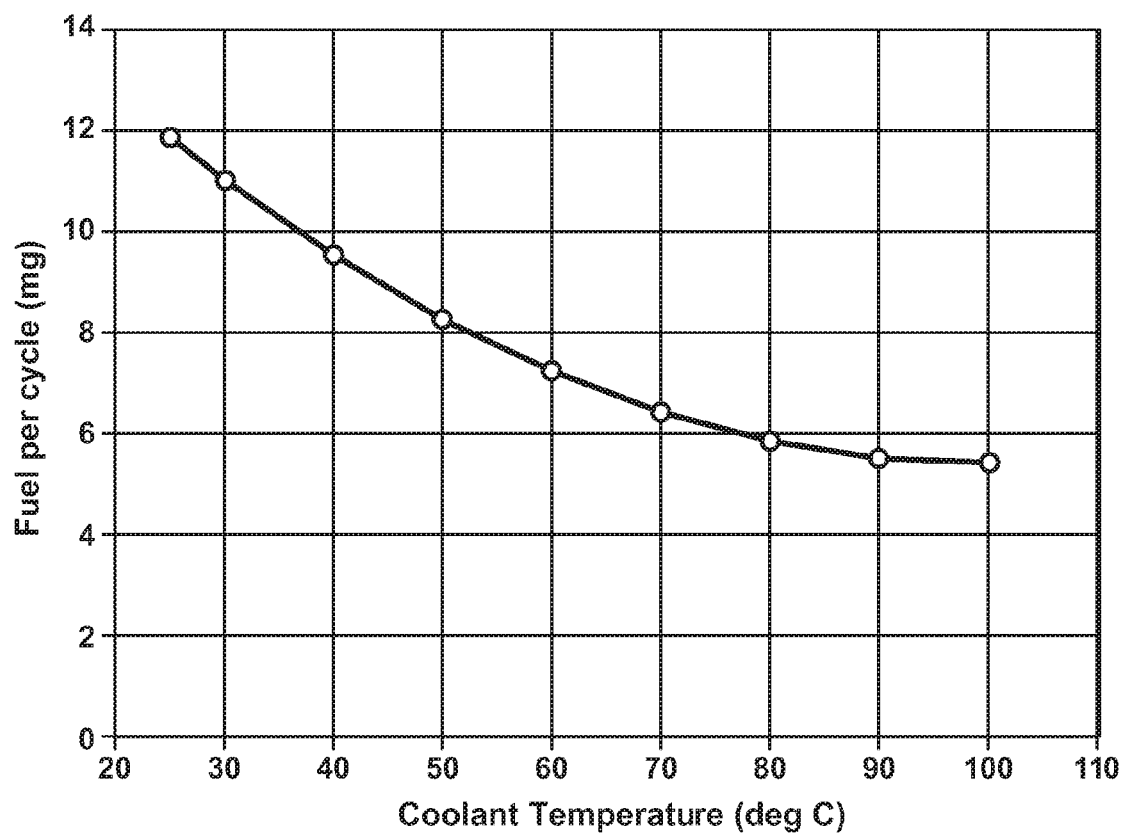
FIG. 5 illustrates an exemplary fuel mass delivery schedule correlated to engine operating temperature for use in engine warm-up control in accordance with the present disclosure.

The temperature dependant warm-up operation as shown in FIGS. 2-4 is carried out within and between all sub-regions using a substantially static NVO setting of preferably between about 180 to about 200 crank angle degrees—at or close to the NVO limits of the VCP. In other words, load variations during the warm-up operation do not significantly affect or influence NVO. Certain preferential injection timings, including general combustion cycle region placements of the split injections as well as injection specific end of injection ('EOI') timings and trends, are set forth in further detail herein below. Correlation between temperature and load (as represented by total fuel mass ('mg/cycle')) are shown in FIG. 5 which also represents a preferred minimum per cylinder total fuel mass delivery schedule for the exemplary engine running on fully-blended gasoline fuels with the Research Octane Number (RON) equal to 91 and the Motor Octane Number (MON) equal to 83 (i.e. Octane Index=87 by the commonly accepted (RON+MON)/2 Octane rating). Further, engine idle speed of substantially 800 to 1000 RPM was utilized. For the purposes of this disclosure, regular octane fuel is meant to include fuel as described above with an Octane Index of substantially 87, whereas high octane or premium octane fuel is meant to include fuel as described above with an Octane Index of substantially 91. One having ordinary skill in the art will recognize that the general nature of the fuel mass delivery schedule will be substantially similar in normalized load terms though absolute fuel mass will vary in accordance with such factors as engine displacement, energy content of the fuel employed, engine idle speed settings, and engine output shaft loading (e.g. transmission in park/neutral or transmission in drive with driveline grounded through the service brake application).

Within the low temperature region as shown in FIG. 2 the engine is operated with split injection with the first injection $EOI_1$ taking place during NVO and the second injection $EOI_2$ also taking place during NVO. More particularly, $EOI_1$ preferably takes place about 350 to about 360 crank angle degrees before top dead center ('bTDC') combustion and $EOI_2$ preferably takes place about 270 to about 300 crank angle degrees bTDC combustion. A preferred range for spark delivery during low temperature region operation is about 10 to about 0 crank angle degrees bTDC combustion. This spark delivery is later than spark delivery timings given below for other regions. Retarded spark delivery timing passes more energy in the form of heat through the combustion process to the exhaust gas flow as a method to bring the catalytic converter and other aftertreatment devices up to operating temperature. Temperature selection to transition from the retarded spark timing to normal spark timing will vary from application to application and is not disclosed in detail herein. At a selected low temperature region of below about 30 degrees Celsius as measured for example by coolant temperature, fuel mass ratio of the first to second injection is preferably about 1:5. Preferably, fuel mass fraction shifts to the first injection at higher or premium octane fuel, with the fuel mass ratio of the first to second injection preferably about 1:2. Furthermore, it has been demonstrated that both $EOI_1$ and $EOI_2$ timing should advance with increasing operating temperature.

Within the middle temperature region as shown in FIG. 3, the engine is operated with split injection with the first injection $EOI_1$ taking place during NVO and the second injection $EOI_2$ also taking place during NVO. More particularly, $EOI_1$ preferably takes place about 360 to about 370 crank angle degrees bTDC combustion and $EOI_2$ preferably takes place about 270 to about 300 crank angle degrees bTDC combustion. While split injection as described and illustrated is preferred for the middle temperature region, a single injection—at least partially during NVO—of the total cycle fuel mass may be satisfactorily employed. In such a single injection embodiment within the middle temperature region, an EOI of about 270 to about 330 crank angle degrees bTDC combustion is preferably effected. In order to implement a single injection in the middle temperature region, a transitional or threshold engine operating temperature must be selected to switch from split injection to single injection, and another, higher engine operating temperature must be selected to switch back to split injection in accordance with transitioning to the high temperature region as described below. These threshold temperatures will vary from engine application to engine application. A preferred range for spark delivery during middle temperature region operation is about 10 to about 60 crank angle degrees bTDC combustion. At a selected middle temperature region of about 50 to 60 degrees Celsius as measured for example by coolant temperature, fuel mass ratio of the first to second injections is preferably about 1:7. Preferably, fuel mass fraction shifts to the first injection at higher or premium octane fuel, with the fuel mass ratio of the first to second injection preferably about 2:6. Furthermore, it has been demonstrated that both $EOI_1$ and $EOI_2$ timing should advance with increasing operating temperature.

Within the high temperature region as shown in FIG. 4, the engine is operated with split injection. However, in contrast to the low and middle temperature regions, the first injection $EOI_1$ takes place during NVO whereas the second injection $EOI_2$ takes place during the compression phase. More particularly, $EOI_1$ preferably takes place about 370 to about 440 crank angle degrees bTDC combustion and $EOI_2$ preferably takes place about 25 to about 50 crank angle degrees bTDC combustion. A preferred range for spark delivery during high temperature region operation is about 10 to about 60 crank angle degrees bTDC combustion. At a selected high temperature region of substantially 80 to 90 degrees Celsius as measured by coolant temperature, fuel mass ratio of the first to second injections is preferably about 1:4.5. Preferably, fuel mass fraction shifts to the first injection at higher or premium octane fuel, with the fuel mass ratio of the first to second injection preferably about 1.5:4. Furthermore, it has been demonstrated that $EOI_1$ timing should advance with increasing operating temperature, whereas $EOI_2$ timing should retard with increasing operating temperature.

With the described minimal definition of low, middle and high temperature regions of engine operation within a predefined engine idle warm-up operating region, operation as defined by particular engine parameters within the entire warm-up operating region can be satisfactorily defined with substantially linear interpolations. As illustrated by exemplary minimum fuel requirements depicted in test results within FIG. 5, total cycle fuel requirements may be derived through simple linear interpolation between the fuel requirements of the adjacent regions. Similarly, fuel split quantities between zones between the regions can be interpolated between known values defined in the regions. And depending upon the proximity of respective end of injections, EOI timing transitions between adjacent regions may similarly employ simple interpolative techniques in determining the end of injection timings. For example, whereas the respective $EOI_1$ and $EOI_2$ timings for low and middle temperature regions are substantially adjacent or even overlapping in their crank angle ranges, simple interpolative techniques will provide rational control outcomes with respect to the interpolated crank angle for $EOI_1$ and $EOI_2$ timings. This can be seen to be true also with respect to $EOI_1$ timings for middle and high temperature regions which, too, are substantially adjacent in their crank angle ranges. However, whereas the respective $EOI_2$ timings for middle and high temperature regions are not substantially adjacent in their crank angle ranges (e.g. almost 360 crank angle degrees of separation), simple interpolative techniques will not provide rational control outcomes with respect to the interpolated crank angle for $EOI_2$ timings. But, it has been demonstrated that there is sufficient overlap in warm-up temperatures of the engine at which either the middle or high temperature controls may effect satisfactorily stable spark assisted HCCI combustion. Therefore, within this common warm-up temperature space, in accordance with such factors as the rate of change of the engine operating temperature and engine emission tradeoffs, a non-interpolative control transition is effected. For example, it has been demonstrated during rising operating temperatures that fueling in accordance with split injections as shown in the middle temperature region control of FIG. 3, including the advancing $EOI_2$ timing, while providing satisfactory NOx and smoke emissions will result in increasing hydrocarbon (HC) emissions and declining combustion stability. It has also been demonstrated, however, during rising operating temperatures that fueling in accordance with split injections as shown in the high temperature region control of FIG. 4, including the retarding of $EOI_2$ timing, will provide comparatively lower HC emissions, somewhat higher comparative NOx and smoke emissions, yet improved combustion stability. Therefore, ultimately the non-interpolative control transition will be determined by emission and combustion stability tradeoffs.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method of operating an internal combustion engine in a four-stroke combustion cycle, said engine including a direct-injection fuel system, a spark-ignition system, and a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston, said method comprising:

determining engine temperature within a predefined warm-up temperature region of engine operation, said warm-up temperature region including predefined non-overlapping low, middle and high temperature regions of engine operation;

controlling intake and exhaust valves within said warm-up temperature region of engine operation to effect a partial-lift, negative valve overlap of about 180 to about 200 crank angle degrees; and in said low temperature region of engine operation, injecting a low temperature region predetermined total fuel mass comprising a low temperature region first injection terminating at about 350 to about 360 crank angle degrees before top dead center combustion and a low temperature region second injection terminating at about 270 to about 300 crank angle degrees before top dead center combustion;

in said middle temperature region of engine operation, injecting a middle temperature region predetermined total fuel mass comprising a middle temperature region first injection terminating at about 270 to about 300 crank angle degrees before top dead center combustion; and in said high temperature region of engine operation, injecting a high temperature region predetermined total fuel mass comprising a high temperature region first injection terminating at about 370 to about 440 crank angle degrees before top dead center combustion and a high temperature region second injection terminating at about 25 to about 50 crank angle degrees before top dead center combustion.

2. The method of claim 1, wherein injecting a middle temperature region predetermined total fuel mass consists of only the middle temperature region first injection.

3. The method of claim 1, wherein injecting a middle temperature region predetermined total fuel mass further comprises a middle temperature region second injection terminating at about 360 to about 370 crank angle degrees before top dead center combustion.

4. The method of claim 1, further comprising:
in a temperature region between adjacent ones of the low, middle and high temperature regions, injecting a fuel mass based on the engine temperature and interpolated from the two respective fuel masses corresponding to said adjacent ones of the low, middle and high temperature regions.

5. The method of claim 2, further comprising:
in a temperature region between adjacent ones of the low, middle and high temperature regions, injecting a fuel mass comprising a first injection terminating at a crank angle based on the engine temperature and interpolated from the two respective first injection termination crank angles corresponding to said adjacent ones of the low, middle and high temperature regions.

6. The method of claim 3, further comprising:
in a temperature region between adjacent ones of the low, middle and high temperature regions, injecting a fuel mass comprising a first injection terminating at a crank angle based on the engine temperature and interpolated from the two respective first injection termination crank angles corresponding to said adjacent ones of the low, middle and high temperature regions.

7. The method of claim 3, further comprising:
in a temperature region between said middle and high temperature regions, injecting a fuel mass comprising a second injection terminating at a crank angle based on the engine temperature and interpolated from the two respective second injection termination crank angles corresponding to said middle and high temperature regions.

8. The method of claim 3, wherein:
said low temperature region predetermined total fuel mass comprises a respective ratio of said respective first to said respective second low temperature injections, said middle temperature region predetermined total fuel mass comprises a respective ratio of said respective first to said respective second low temperature injections, said high temperature region predetermined total fuel mass comprises a respective ratio of said respective first to said respective second low temperature injections, and further comprising in a temperature region between adjacent ones of the low, middle and high temperature regions, injecting a fuel mass comprising respective first and second injections at a respective ratio based on the engine temperature and interpolated from the two respective injection ratios corresponding to said adjacent ones of the low, middle and high temperature regions.

9. An apparatus for controlling a direct-injection, spark ignition, internal combustion engine within a spark-assisted homogeneous-charge, compression-ignition range during engine warm-up at idle conditions, comprising:

a control system monitoring engine temperature and effecting control of an engine warm-up procedure comprising
intake and exhaust valve control to effect a partial-lift, negative valve overlap of about 180 to about 200 crank angle degrees, fuel mass injection according to an idle warm-up stable combustion minimum fuel mass delivery schedule, said schedule comprising:

a low temperature fuel mass value in a low temperature region;

a middle temperature fuel mass value in a middle temperature region, a high temperature fuel mass value in a high temperature region, and interpolated minimum fuel mass delivery values, estimated across a range of engine temperatures between said low temperature and said high temperature by interpolation based on said low temperature fuel mass value, said middle temperature fuel mass value, and said high temperature fuel mass value; and fuel mass injection timing to effect split injection effective to sustain said spark-assisted homogeneous-charge, compression-ignition operation.

10. The apparatus of claim 9, wherein said fuel mass injection timing comprises:

in said low temperature region, a first end of injection between about 350 and 360 degrees before top dead center combustion and a second end of injection between about 270 and 300 degrees before top dead center combustion;

in said middle temperature region, said first end of injection between about 360 and 370 degrees before top dead center combustion and said second end of injection between about 270 and 300 degrees before top dead center combustion; and in said high temperature region, said first end of injection between about 370 and 440 degrees before top dead center combustion and said second end of injection between about 25 and 50 degrees before top dead center combustion.

11. The apparatus of claim 9, wherein said low temperature region, said middle temperature region, and said high temperature region are defined by said engine temperature, and wherein said low temperature region is less than about 30 degrees Celsius, wherein said middle temperature region is between about 50 and 60 degrees Celsius, and wherein said high temperature region is between about 80 and 90 degrees Celsius.

* * * * *